United States Patent
Bratkovski et al.

(10) Patent No.: US 8,109,151 B2
(45) Date of Patent: Feb. 7, 2012

(54) FLOW SENSING SYSTEMS AND METHODS

(75) Inventors: Alexandre M. Bratkovski, Mountain View, CA (US); Iakov Veniaminovitch Kopelevitch, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 208 days.

(21) Appl. No.: 12/694,260

(22) Filed: Jan. 26, 2010

(65) Prior Publication Data

US 2011/0179880 A1 Jul. 28, 2011

(51) Int. Cl.
*G01F 1/56* (2006.01)
(52) U.S. Cl. .................................. 73/861.08
(58) Field of Classification Search ............... 73/861.08
See application file for complete search history.

(56) References Cited

U.S. PATENT DOCUMENTS

| 6,718,834 | B1 | 4/2004 | Sood et al. | |
|---|---|---|---|---|
| 7,625,475 | B2 * | 12/2009 | Howard | 204/451 |
| 7,819,005 | B2 * | 10/2010 | Rueger | 73/579 |

FOREIGN PATENT DOCUMENTS

| JP | 2005172506 | 6/2005 |
|---|---|---|
| WO | WO2007011413 | 1/2007 |

OTHER PUBLICATIONS

Tong Wei, et al., Movement-induced voltage properties of stable graphite nanoplatelet suspensions, Materials Letters 63, 1608-1610 (2009).
Jianwei Liu, et al. Multiwalled carbon nanotubes for flow-induced voltage generation, Journal of Applied Physics 101, 064312 (2007).
Ghosh, S., et al., "Carbon nanotube flow sensors," 2003, Science (USA), Science, Feb, 14, 2003, American Assoc. Adv. Sci., USA,vol, 299, No. 5609, Jan. 16, 2003, pp. 1042-1044.
C.L. Cao, A Flow Sensor for Liquids Based on Single-Walled Carbon Nanotube Thin Films, http://www.scientific.net/SSP.121-123.75, Publication Date: Mar. 2007; pp. 75-79.
Steve Tung, A Micro Shear Stress Sensor Based on Laterally Aligned Carbon Nanotubes, http://www2.acae.cuhk.edu.hk/~cmns/papers/sensors-and-actuators-2006-wychow.pdf, Apr. 27, 2006.
Carmen K.M. Fung, Flow Rate Measurement Inside Polymer Microfluidic Systems Using Carbon Nanotube Sensors, http://ieeexplore.ieee.org/Xplore/login.jsp?url=http%3A%2F%2Fieeexpl.

\* cited by examiner

*Primary Examiner* — Jewel V Thompson

(57) ABSTRACT

A flow sensing system is provided. The system can include a first graphitic member and a first measurement device communicatively coupled to the first graphitic member. The first measurement device is adapted to measure a voltage along each of a plurality of orthogonal axes defined by the first graphitic member. The system can further include a display communicatively coupled to the first measurement device, the display adapted to convert the measured voltages into a signal proportionate to the fluid flow past the first graphitic member.

17 Claims, 4 Drawing Sheets

FLOW SENSING SYSTEMS AND METHODS

BACKGROUND OF THE INVENTION

Description of the Related Art

Fluid flow measurement is an oft-monitored system parameter used to provide fundamental information on system performance. Typical applications include measuring fluid flow in various open and closed conduits in refineries, chemical processing facilities, water treatment facilities, and the like. In process related applications such as those previously mentioned, the flow sensors used to measure fluid flow are relatively easy to access for installation and maintenance, thereby making the requisite power and signal connections to the flow sensors relatively straightforward. In other applications, such as oilfield and medical applications, access for installation and maintenance of the flow sensors is considerably greater in difficulty than in a process environment. Additionally, power and signal connections may be difficult to establish with the flow sensor due to the relatively tight confines of the operating environment.

BRIEF DESCRIPTION OF THE DRAWINGS

Advantages of one or more disclosed embodiments may become apparent upon reading the following detailed description and upon reference to the drawings in which.

DETAILED DESCRIPTION

Figure 1:
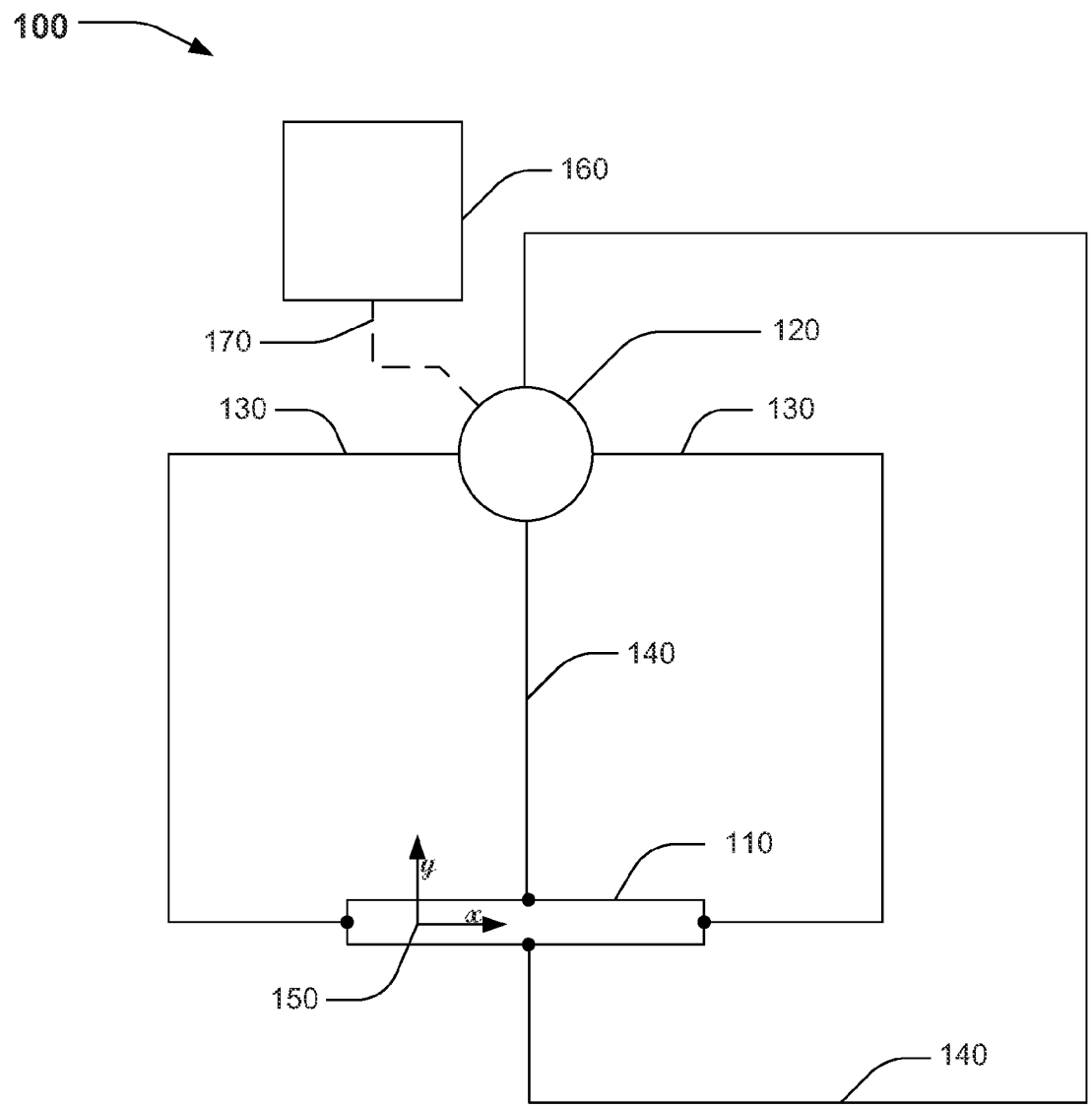
FIG. 1 is a schematic diagram depicting an illustrative flow sensing system, according to one or more embodiments described herein.

The use of flow sensors to measure fluid flow is ubiquitous throughout many industries. Fluid flow rates are used to monitor and control processes and therefore frequently play an important role in the performance and safety of systems and devices ranging from chemical processes to refining to medical applications. Flow sensors are typically mounted in situ, located close or within the process they monitor. Flow sensors often have substantial mounting requirements to ensure accuracy, and many flow sensors lose accuracy as the flowrate being monitored decreases. Couple the inherent mounting and accuracy concerns with the high cost associated with many types of flow sensors, one can readily appreciate the significance of the issues facing the manufacturers of flow sensors and flow sensing systems.

As used herein, the term "fluid" can refer to any substance, including one or more liquids, one or more gassed, or a bed of one or more solids capable of exhibiting fluid-like properties, for example when the solids are mixed with an appropriate quantity of liquid or gas to form a fluidized bed.

A flow sensing system is provided. The system can include a first graphitic member and a first measurement device communicatively coupled to the first graphitic member. The first measurement device is adapted to measure a voltage along each of a plurality of axes defined by the first graphitic member. The system can further include a display communicatively coupled to the first measurement device, the display adapted to convert the measured voltages into a signal proportionate to the fluid flow past the first graphitic member.

As used herein the term "graphite" and "graphitic" refers to any item, system, or device made of or containing graphite. The term "graphite" refers to any soft, steel-gray to black, hexagonally crystallized, electrically conducting, allotrope of carbon with a metallic luster and a greasy feel. Graphite is commercially available in many forms, including, but not limited to, sheets, fabrics, laminated sheets, and pyrolytic graphite—all of which can be referred to as "graphitic" in nature. The terms "graphite" and "graphitic" can also refer to compounds containing graphenes, for example multi-layer graphene (MLG) and similar graphenic compounds. Pyrolytic graphite and highly oriented pyrolytic graphite ("HOPG") are unique forms of graphite that are generally ultra-pure, near theoretical density, and extremely anisotropic. Pyrolytic graphite and highly oriented pyrolytic graphite are typically grown onto a substrate material that provides the resultant graphitic material a layered composition. The crystals forming each layer of a pyrolytic graphite member can be oriented in the same or different directions. Unidirectional layers of graphite can be laminated to form a laminated member, each ply of which can be oriented in the same or different directions.

A flow sensing apparatus is also provided. The apparatus can include a first graphitic member and a second graphitic member disposed at a known, fixed, angle measured with respect to the first graphitic member. The apparatus can further include a first measurement device communicatively coupled to the first graphitic member, adapted to measure a voltage along each of a plurality of orthogonal axes defined by the first graphitic member; and a second measurement device communicatively coupled to the first graphitic member, adapted to measure a voltage along each of a plurality of orthogonal axes defined by the second graphitic member.

A flow sensing method is also provided. In some embodiments, the method can include flowing a fluid stream about a first graphitic member. The method can also include communicatively coupling the first graphitic member to a first measurement device, the first measurement device adapted to measure a voltage along each of a plurality of orthogonal axes defined by the first graphitic member. The method can include communicatively coupling the first measurement device to a display and determining the fluid flow about the first graphitic member using the display, wherein the fluid flow about the first graphitic member is proportionate to at least a portion of each of the plurality of measured voltages produced by the first graphitic member.

FIG. 1 is a schematic diagram depicting an illustrative flow sensing system 100, according to one or more embodiments. The system 100 can include a first graphitic member 110 communicatively coupled 130, 140 to a first measurement device 120. In at least some embodiments, the first measurement device 120 can be adapted to measure a voltage along each of a plurality of axes 150 defined by the first graphitic member 110. In at least some embodiments, the axes 150 can be orthogonal axes, for example a longitudinal axis and a transverse axis defined by the first graphitic member 110. The system can further include a display 160 communicatively coupled 170 to the first measurement device 120. In at least some embodiments, the display 160 can convert the measured voltages into a signal proportionate to the fluid flow past the first graphitic member.

As used herein, the term "communicative coupling," or a connection by which entities are "communicatively coupled," is one in which signals, physical communications, and/or logical communications may be sent and/or received. Typically, a communicative coupling includes a physical interface, an electrical interface, and/or a data interface, but it is to be noted that a communicative coupling may include differing combinations of these or other types of connections sufficient to allow intermittent or continuous communication or control. For example, two entities can be communicatively coupled by being able to communicate signals to each other directly or through one or more intermediate entities like a processor, operating system, a logic device, software, or other entity. Logical and/or physical communication channels can be used to create a communicative coupling between entities.

The first graphitic member 110 can be a single or multi-layer graphite containing member having any shape, thickness, or geometry. In at least some embodiments, the first graphitic member 110 can include a plurality of proximately disposed graphitic layers each layer having a unidirectional crystalline structure (i.e. a crystalline structure where the graphite crystals forming the layer lie principally along a single axis). In at least some embodiments, adjacent crystalline layers forming the first graphitic member 110 can be oriented along differing principal axes. In at least some embodiments, the first graphitic member 110 can be a layered member where at least a portion of the layers are wholly or partially oriented along differing, orthogonal, principal axes, for example along an x-axis, y-axis, and z-axis. The first graphitic member 110 can have other planar and non-planar geometric shapes, for example one or more planar graphitic structures can be formed into a three-dimensional shape having three principal orthogonal axes, for example a cubic or rectilinear structure aligned along an x-axis, y-axis, and z-axis.

In at least some embodiments, the first graphitic member 110 can include a laminated crystalline graphitic member composed of a plurality of graphite layers, each layer having the same or differing thicknesses. In some embodiments, each of the plurality of layers can have a thickness of about $1 \times 10^{-9}$ meters (1 nm) or less; about $1 \times 10^{-6}$ meters (1 µm) or less; about $1 \times 10^{-3}$ meters (1 mm) or less; about $1 \times 10^{-2}$ meters (1 cm) or less; or about $1 \times 10^{-1}$ meters (1 dm) or less.

The first graphitic member 110 can include any number of graphitic devices, systems or combination of systems and devices suitable for creating a voltage proportionate to a fluid flow rate around, across, or about the member. In at least some embodiments, the fluid can include one or more liquids, for example one or more polar liquids, one or more non-polar liquids, or any combination thereof. In at least some embodiments, the fluid can be a liquid and the voltage developed by the first graphitic member 110 can be proportional to the liquid flow rate around, across, or about the member. In at least some embodiments, the voltage developed by the first graphitic member 110 can be about 0.1 millivolts ("mV") to 0.25 mV for a liquid flowrate of from about 1×10-7 meters per second ("m/s") to about 5×10-6 m/s; about 0.25 mV to 1 mV for a liquid flowrate of from about 5×10-6 m/sec to about 5×10-5 m/s; about 1 mV to 2 mV for a liquid flowrate of from about 5×10-5 m/sec to about 8×10-3 m/s; or about 2 mV to 3.3 mV for a liquid flowrate of from about 8×10-3 m/sec to about 9×10-1 m/s. Thus, in liquid applications, the liquid flowrate about the first graphitic member 110.

Additional information regarding the relationship between flow across a carbon nanotube and the voltage produced therefrom is discussed in detail in "Carbon Nanotube Flow Sensors," S. Ghosh, et al., in Science 299, 1042 (2003); in U.S. Pat. No. 6,718,834 to Sood, et al.; by J. Liu, et al. in J. Appl. Phys. 101, 064312 (2007); and by T. Wei, et al., in Materials Letters 63, 1608 (2009) all of which are incorporated by reference herein.

In at least some embodiments, a first voltage can be generated that is proportionate to the flow rate of the liquid flowing parallel to the longitudinal axis of the first graphitic member 110. In a like manner, a second voltage can be generated that is proportionate to the flow rate of the liquid flowing perpendicular or transverse to the longitudinal axis of the first graphitic member 110.

The first measurement device 120 can include any number of systems, devices, or any combination of systems and devices suitable for measuring all or a portion of the voltage generated by the first graphitic member 110 as a result of fluid flowing about the member. In some embodiments, the first measurement device 120 can include a plurality of voltage inputs, for example two voltage inputs as depicted in FIG. 1. A first measurement device 120 having multiple inputs could be used, for example, to measure both the longitudinal voltage along the first graphitic member 110 (e.g., along a x-axis defined by the orthogonal axes 150 depicted in FIG. 1) via a first communicative coupling 130, and the transverse voltage across the first graphitic member 110 (e.g., along a y-axis defined by the orthogonal axes 150 depicted in FIG. 1) via a second communicative coupling 140, again as depicted in FIG. 1. In at least some embodiments, the first measurement device 120 can be a voltmeter suitable for measuring voltages of from about 0.1 mV to about 1,000 mV.

In at least some embodiments, the first measurement device 120 can be communicatively coupled 170 to a display 160. The display 160 can include any number of devices, systems, or any combination of systems and devices adapted to display one or more values. In at least some embodiments, the one or more values displayed by the display 160 can include all or a portion of the voltage signals communicated by the first measurement device 120. In at least some embodiments, the one or more values displayed by the display 160 can include one or more fluid flow rates calculated based upon all or a portion of the voltage signals communicated by the first measurement device 120. Other features can be incorporated into the display 160 to suit the requirements of the user, for example fluid density can be incorporated into the display 160 to convert a fluid volumetric flow rate to a fluid mass flow rate.

Figure 2:
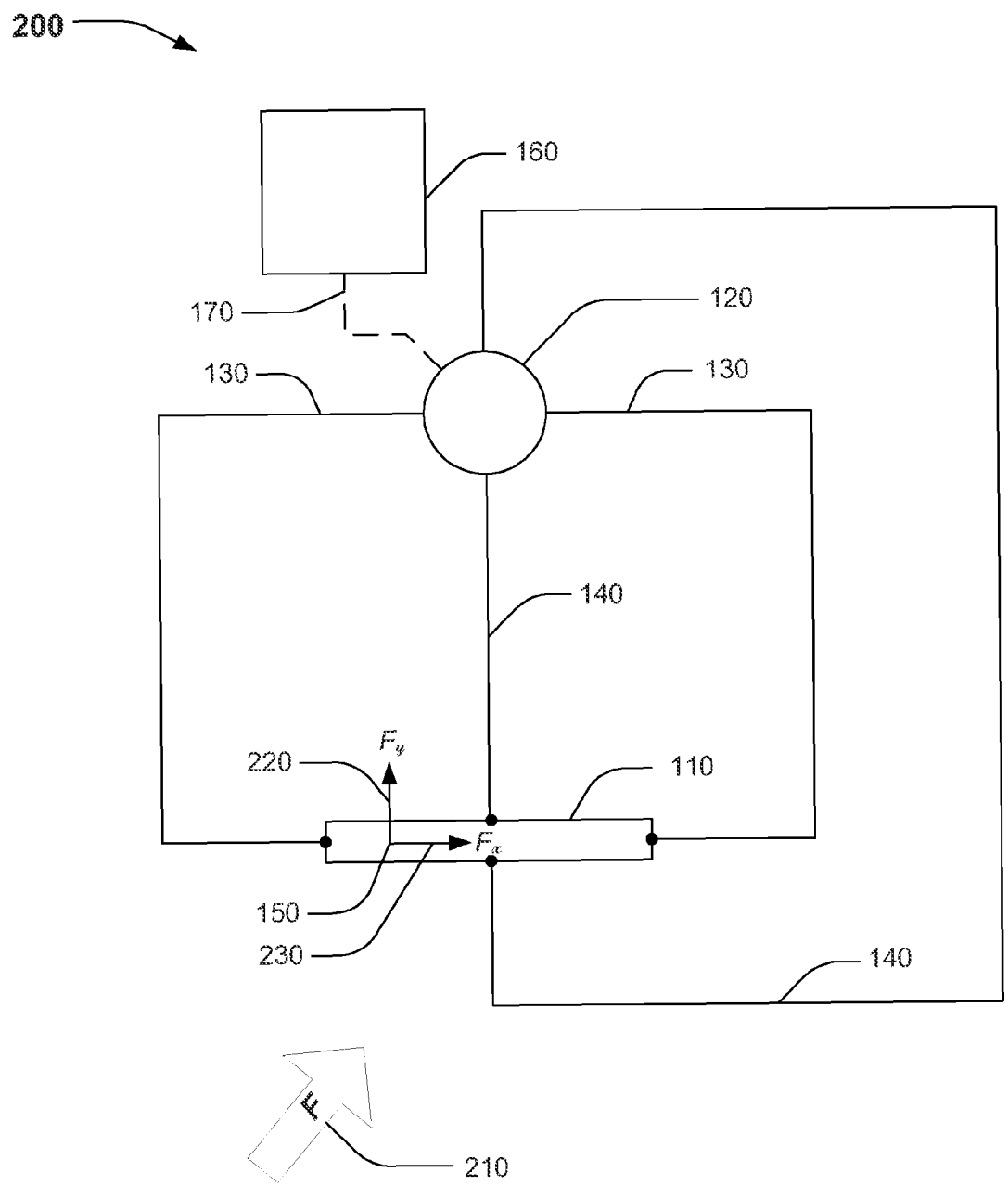
FIG. 2 is a schematic diagram depicting another illustrative flow sensing system, according to one or more embodiments described herein.

FIG. 2 is a schematic diagram depicting another illustrative flow sensing system 200, according to one or more embodiments. As depicted in FIG. 2, a fluid flow "F" 210 can be directed across the first graphitic member 110. In some embodiments, the first graphitic member can be a multi-layer member, for example a multi-layer highly oriented pyrolytic graphite ("HOPG") member having at least one crystalline layer oriented along a y-axis 220, and at least one crystalline layer oriented along an x-axis 230. While the multi-layer first graphitic member 110 described herein includes layers disposed orthogonally (i.e. at an angle of about 90° measured with respect to each other), other angles can be used with equal efficacy.

As the fluid flow "F" 210 passes around the first graphitic member 110, the angle of incidence between the fluid flow "F" 210 and the member can be any angle from about 0° (i.e. flow is along the longitudinal, x-axis 230, of the member) to about 90° (i.e. flow is along the transverse, y-axis 220, of the member). In at least some embodiments, for any angle of fluid flow incidence, the flow can be broken into two vector components, a vector flow component $F_y$ aligned with the y-axis and a vector flow component $F_x$ aligned with the x-axis, the vector total of the two vector flow components can provide both the overall rate of flow of fluid flow "F" 210 as well as the direction of the overall fluid flow "F" 210.

A laminar flow regime is one which occurs when a fluid flows in parallel layers, with no disruption between the layers. In other words, when the flow vectors characterizing the fluid flow at a particular point are parallel to each other. A turbulent flow regime, on the other hand, is a fluid regime characterized by chaotic, stochastic property changes, where the flow vectors characterizing the fluid flow at a particular point are not parallel to each other. In at least some embodiments, the first graphitic member 110 can be used to determine whether a given fluid flow "F" 210 is experiencing a laminar flow regime or a turbulent flow regime.

In at least some embodiments, a laminar flow regime can be detected when at least one of the measured voltages generated by the first graphitic member 110 falls below a predetermined threshold. For example, if the voltage measured along a first axis exceeds a predetermined threshold, while the voltage measured along a second, different, axis is less than a predetermined threshold, a laminar flow regime can be detected along the first axis.

In at least some embodiments, a turbulent flow regime can be detected when at least a plurality of measured voltages generated by the first graphitic member 110 are greater than a predetermined threshold. For example, if the voltage measured along a first axis exceeds a predetermined threshold, and the voltage measured along a second, different, axis also exceeds a predetermined threshold, a turbulent flow regime can be detected along the first graphitic member.

Figure 3:
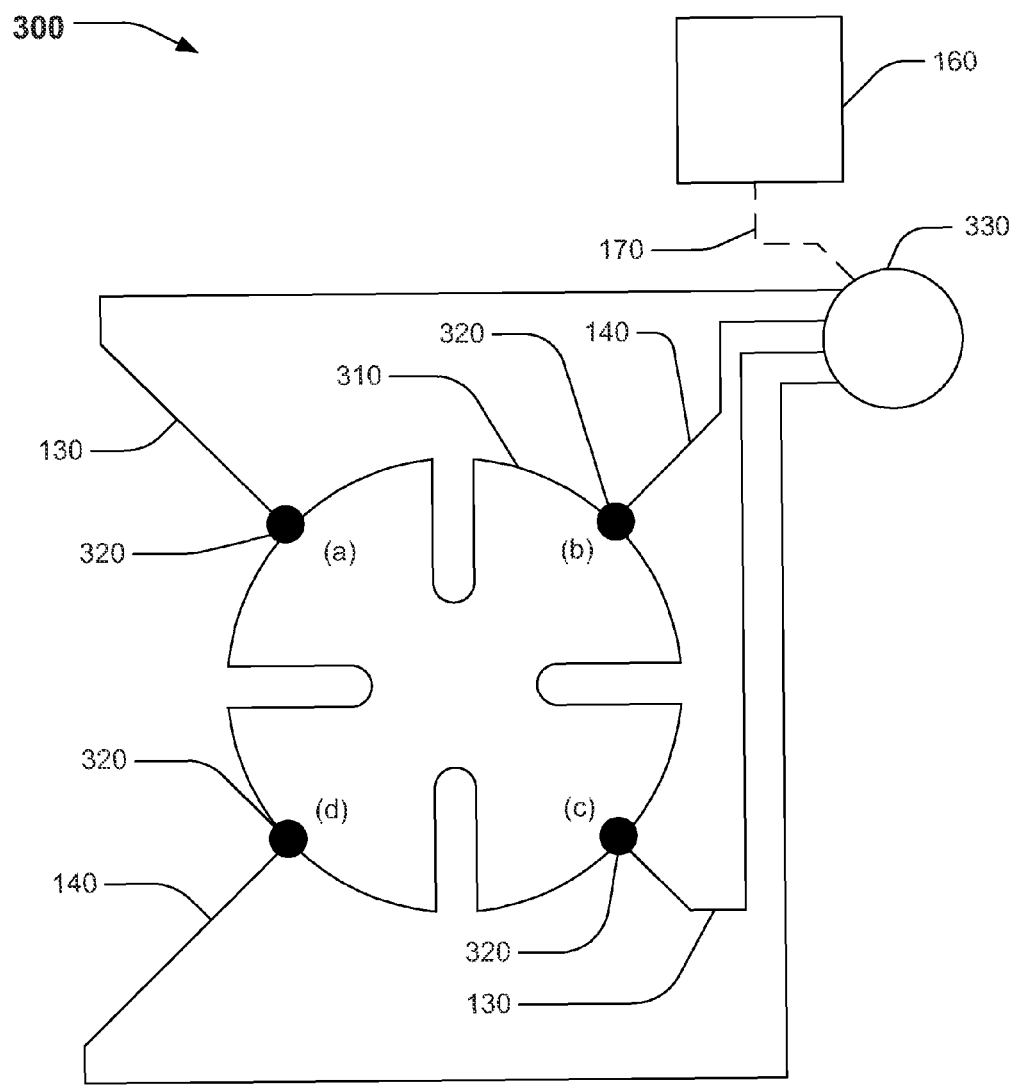
FIG. 3 is a plan view depicting an illustrative flow sensor, according to one or more embodiments described herein.

FIG. 3 a schematic diagram depicting another illustrative flow sensing system 300, according to one or more embodiments. In at least some embodiments, the first graphitic member 310 can have any shape, size or configuration necessary to meet the expected fluid flow conditions. An illustrative first graphitic member 310 in the form of a notched disk is depicted in FIG. 3. In some embodiments, the first graphitic member 310 can include multiple connection points 320 for a first measurement device 330.

The first graphitic member 310 can be a single or multilayer member having any number of symmetric or asymmetric connection points 320 for the first measurement device 330. In at least some embodiments, the first graphitic member can include a plurality of symmetric connection points 320 disposed about the member 310, for example the four symmetric connection points 320 labeled (a), (b), (c), and (d) as depicted in FIG. 3. Using such an arrangement of connection points 320, the voltage between any two points, $V_{a-b}$, $V_{a-c}$, $V_{a-d}$, $V_{b-c}$, $V_{b-d}$, $V_{c-d}$, can be measured using the first measurement device 330. Such an arrangement can be useful in determining fluid flow rate and direction in a system where variable fluid flow velocities and directions can occur.

Figure 4:
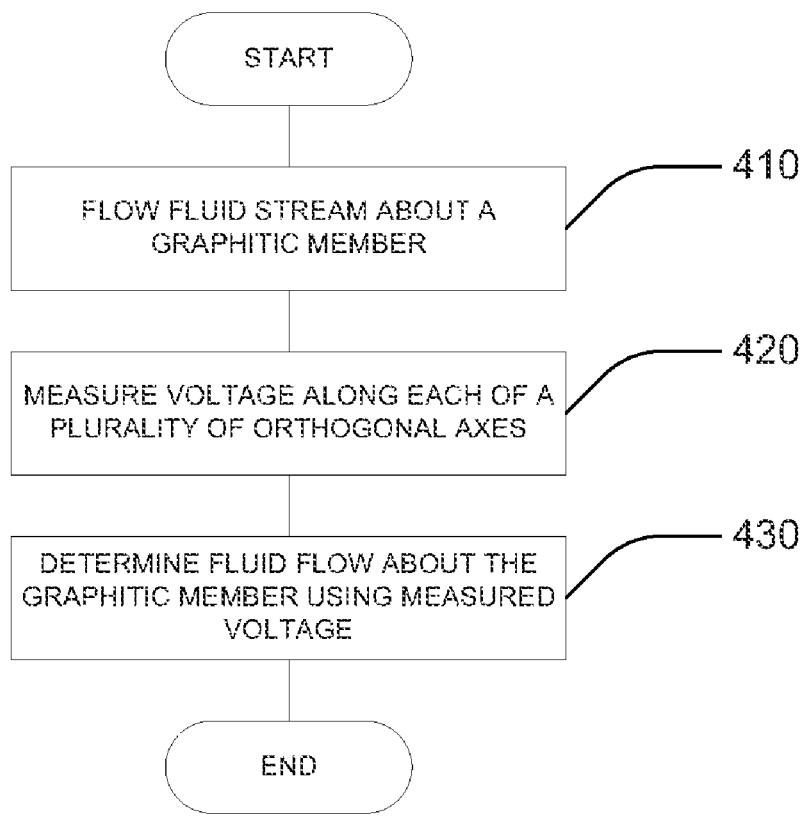
FIG. 4 is a flow diagram depicting an illustrative flow sensing method, according to one or more embodiments described herein.

FIG. 4 is a flow diagram depicting an illustrative flow sensing method 400, according to one or more embodiments. The method can include flowing a fluid about a first graphitic member 110, 310 in 410.

A first measurement device 120, 330 can be used to measure the voltage along each of a plurality of axes in 420. In some embodiments, the axes forming the plurality of axes can be orthogonal.

Based upon the measured voltages in 420, the fluid flow rate about the first graphitic member 110, 310 can be determined in 430. In some embodiments, the fluid flow direction about the first graphitic member 110, 310 can also be determined.

Certain embodiments and features have been described using a set of numerical upper limits and a set of numerical lower limits. It should be appreciated that ranges from any lower limit to any upper limit are contemplated unless otherwise indicated. All numerical values are "about" or "approximately" the indicated value, and take into account experimental error and variations that would be expected by a person having ordinary skill in the art.

All patents, patent applications, articles, books, specifications, other publications, documents and things referenced herein are hereby incorporated herein by this reference in their entirety for all purposes. To the extent of any inconsistency or conflict in the definition or use of a term between any of the incorporated publications, documents or things and the text of the present document, the definition or use of the term in the present document shall prevail.

While the foregoing is directed to embodiments of the present invention, other and further embodiments of the invention may be devised without departing from the basic scope thereof, and the scope thereof is determined by the claims that follow.

What is claimed is:

1. A flow sensing system, comprising:
   a first graphitic member (110);
   a first measurement device (120) communicatively coupled (130, 140) to the first graphitic member, adapted to measure a voltage along each of a plurality of axes (150) defined by the first graphitic member; and
   a display (160) communicatively coupled (170) to the first measurement device, the display adapted to convert the measured voltages into a signal proportionate to the fluid flow past the first graphitic member.

2. The system of claim 1, wherein the plurality of axes defined by the first graphitic member comprises two orthogonal axes, a longitudinal axis and a transverse axis.

3. The system of claim 1, wherein the display is adapted to detect a laminar fluid flow regime about the first graphitic member when at least one of the measured voltages is less than a predetermined threshold.

4. The system of claim 3, wherein the predetermined threshold is approximately zero volts.

5. The system of claim 1, wherein the display is adapted to detect a turbulent fluid flow regime about the first graphitic member when a plurality of the measured voltages are greater than a predetermined threshold.

6. The system of claim 1, wherein the first graphitic member comprises a solid graphitic member.

7. The system of claim 1, wherein the first graphitic member comprises highly oriented pyrolytic graphite ("HOPG") member.

8. The system of claim 7, wherein the first graphitic member comprises a plurality of laminated layers.

9. The system of claim 8, wherein the graphite crystals forming each layer are unidirectional and wherein direction of the graphite crystals for each of the plurality of layers is different than the adjacent layer.

10. A flow sensing apparatus, comprising:
    a first graphitic member;
    a second graphitic member disposed at a known, fixed, angle measured with respect to the first graphitic member;
    a first measurement device communicatively coupled to the first graphitic member, adapted to measure a voltage along each of a plurality of orthogonal axes defined by the first graphitic member; and
    a second measurement device communicatively coupled to the first graphitic member, adapted to measure a voltage along each of a plurality of orthogonal axes defined by the second graphitic member.

11. The apparatus of claim 10, wherein the first graphitic member comprises a planar, highly oriented pyrolytic graphite (HOPG) structure;
  wherein the second graphitic member comprises a planar, highly oriented pyrolytic graphite (HOPG) structure; and
  wherein the first graphitic member and the second graphitic member are bonded to form a laminated graphitic member.

12. The apparatus of claim 10, wherein the first measurement device and the second measurement device comprise a single measurement device having a plurality of voltage inputs.

13. The apparatus of claim 10, further comprising a display communicatively coupled to the first measurement device and the second measurement device; the controller adapted to calculate the flow direction based upon the voltage measured by the first measurement device and the second measurement device.

14. A flow measurement method, comprising:
  flowing a fluid stream about a first graphitic member;
  communicatively coupling the first graphitic member to a first measurement device, the first measurement device adapted to measure a voltage along each of a plurality of orthogonal axes defined by the first graphitic member; and
  communicatively coupling the first measurement device to a display;
  determining the fluid flow about the first graphitic member using the controller, wherein the fluid flow about the first graphitic member is proportionate to at least a portion of each of the plurality of measured voltages produced by the first graphitic member.

15. The method of claim 14, further comprising:
  disposing a second graphitic member within the flowing fluid stream, the second graphitic member disposed at a known, fixed, angle measured with respect to the first graphitic member;
  communicatively coupling the second graphitic member to a second measurement device, the second measurement device adapted to measure a voltage along each of a plurality of orthogonal axes defined by the second graphitic member; and
  communicatively coupling the second measurement device to the controller;
  determining the fluid flow about the second graphitic member using the controller, wherein the fluid flow about the second graphitic member is proportionate to at least a portion of each of the plurality of measured voltages produced by the second graphitic member; and
  determining the fluid flow direction about the first and the second graphitic members using the controller, wherein the fluid flow direction is proportionate to the plurality of measured voltages produced by the first graphitic member and the plurality of measured voltages produced by the second graphitic member.

16. The method of claim 15, wherein the first graphitic member comprises a planar, highly oriented pyrolytic graphite (HOPG) structure;
  wherein the second graphitic member comprises a planar, highly oriented pyrolytic graphite (HOPG) structure; and
  wherein the first graphitic member and the second graphitic member are bonded to form a laminated graphitic member.

17. The method of claim 15, wherein the first measurement device and the second measurement device comprise a single measurement device having a plurality of voltage inputs.

* * * * *